United States Patent
Milner

[19]

[11] Patent Number: 6,068,032
[45] Date of Patent: May 30, 2000

[54] CONTAINER AND SYSTEM FOR COLLECTION AND RECYCLING USED MOTOR OIL

[76] Inventor: Alan R. Milner, 904 Woodlake Dr., Santa Rosa, Calif. 95405

[21] Appl. No.: 09/079,429

[22] Filed: May 14, 1998

Related U.S. Application Data
[60] Provisional application No. 60/046,463, May 14, 1997.

[51] Int. Cl.[7] ....................................................... B65B 3/00
[52] U.S. Cl. ............................. 141/382; 141/10; 141/98; 141/313; 141/325; 141/346; 206/223; 184/1.5
[58] Field of Search ................................. 141/10, 98, 313, 141/314, 316, 325, 326, 346, 351–354, 382; 184/1.5, 106; 206/223; 220/571, 573

[56] References Cited

U.S. PATENT DOCUMENTS

| | | | |
|---|---|---|---|
| Re. 35,270 | 6/1996 | Polett | 363/24 |
| 2,114,485 | 4/1938 | Frolander . | |
| 4,098,398 | 7/1978 | Meyers | 206/223 |
| 4,815,566 | 3/1989 | Caruso et al. | 184/1.5 |
| 5,048,578 | 9/1991 | Dorf et al. | 141/346 |
| 5,121,776 | 6/1992 | Kovach | 141/98 |
| 5,454,960 | 10/1995 | Newsom | 184/1.5 |
| 5,630,451 | 5/1997 | Bernard | 141/10 |
| 5,667,195 | 9/1997 | McCormick | 251/149.6 |
| 5,775,385 | 7/1998 | Tackett, Sr. | 141/98 |

*Primary Examiner*—J. Casimer Jacyna

[57] ABSTRACT

The present invention provides an apparatus for receiving, transporting, and dispersing a viscous product from one storage tank to another. The assembly, includes a housing container, comprising a reusable fill bag and a sealable container secured within the housing container. A hose attaches at one end to the reusable fill bag and at the other end to a male portion of a drain valve system. A female portion of the drain valve system fixably mounts to the storage tanks The viscous product flows between a storage tank and the housing container fill bag after the male portion is inserted into the female portion.

25 Claims, 4 Drawing Sheets

6,068,032

CONTAINER AND SYSTEM FOR COLLECTION AND RECYCLING USED MOTOR OIL

BACKGROUND OF THE INVENTION

1. PRIORITY DOCUMENT

This application claims the benefits of provisional application Ser. No. 60/046,463, filed May 14, 1997.

2. FIELD OF THE INVENTION

Over the last decade, various jurisdictions across the country have started to offer residents who change their own motor oil, hereinafter referred to as Do-It-Yourselfers ("DIYs"), the opportunity to bring their collection of used motor oil to an authorized collection center. In more recent years, some of these same jurisdictions have provided curbside pick up for the same DIY who collects motor oil in a sealable container.

Initially, used oil was collected or sealed in empty plastic milk jugs and left at the curbside or taken to a designated location for pick-up and recycling. Although this method worked well to store the used motor oil for transporting, the used oil placed in the plastic jugs contaminated the jugs so that they could no longer be recycled themselves. Additionally, because it was usually difficult to fill the milk jugs, this method rarely provided an effective and efficient means to collect or disperse the used oil without spilling the oil on the ground or on the hands of the DIY.

In more recent years, heavy reusable plastic containers or bags have been developed to collect and transport used motor oil or other viscous products that could be environmentally hazardous if not properly disposed, such as hydraulic fluid, paint, sewage, etc. However, none of these systems addressed the above issues of effectively and efficiently collecting or dispersing the product without spills. In turn, they did not address the now resounding problem of how to collect and transport the used oil filter of the same vehicle so that it too can also be recycled.

As an example of how used oil collection systems have developed over the years, U.S. Pat. No. 5,667,195 issued to Mathew H. McCormick is incorporated herein by reference in its entirety. The improvements of this system over other prior art is not the use of the heavy plastic structure for containing and dispensing the used oil, but rather the novel quick drain valve system. This drain system provides the means to automatically and simultaneously, in a single operation, connect and open the drain hole of a tank, or other receptacle, and connect it to the plastic fluid containing structure. This is accomplished by permanently replacing the conventional drain hole plug of a tank with a female portion of the quick drain system, and placing a reciprocating male portion of the quick drain system on the end of a hose coupled to the plastic containing structure. Now, although this system provides an improvement to prevent spills during the process for filling the plastic containing structure, like its predecessors, it fails to effectively prevent spills of used motor oil because the coupling hose can leak when removed and because there is no easy way to empty the collected oil into a collection tank. Additionally, the system fails to provide means for collecting and transporting the used oil filter.

In summary, over the past few years there has been a demand in the environmental industry for recycling companies to provide a system that not only collects used oil without spills, but also a system that is self containing, simple to use and reuse, and capable of collecting the removed oil filter of a vehicle. Consequently, it would be advantageous to develop a system that can resolve the above problems.

3. SUMMARY OF THE INVENTION

In one aspect of the present invention, an apparatus is provided for receiving, transporting, and dispersing a viscous product from one storage tank to another. The assembly includes a housing container, comprising a reusable fill bag, and a sealable container secured within said housing container. A hose attaches at one end to the reusable fill bag, and at the other end to a male portion of a drain valve system. A female portion of the drain valve system fixably mounts to the storage tanks, wherein the viscous product flows between one of the storage tanks and the housing container simultaneously with the coupling of the male and female portions of the drain valve system.

In another aspect of the present instant invention, a method is provided for receiving, transporting, and dispersing a viscous product. The method includes the steps of: positioning a housing container adjacent to a storage tank; inserting a male portion into a female portion of a drain valve system to initiate the flow of the viscous product between the storage tank and a fill bag of the housing container; removing the male portion from the female portion of the drain valve system; positioning the hose and male portion in the housing container; and covering the housing container, hose, and male portion.

4. BRIEF DESCRIPTION OF THE DRAWINGS

Other aspects and advantages of the invention will become apparent upon reading the following detailed description and upon reference to the drawings, in which.

Figure 1:
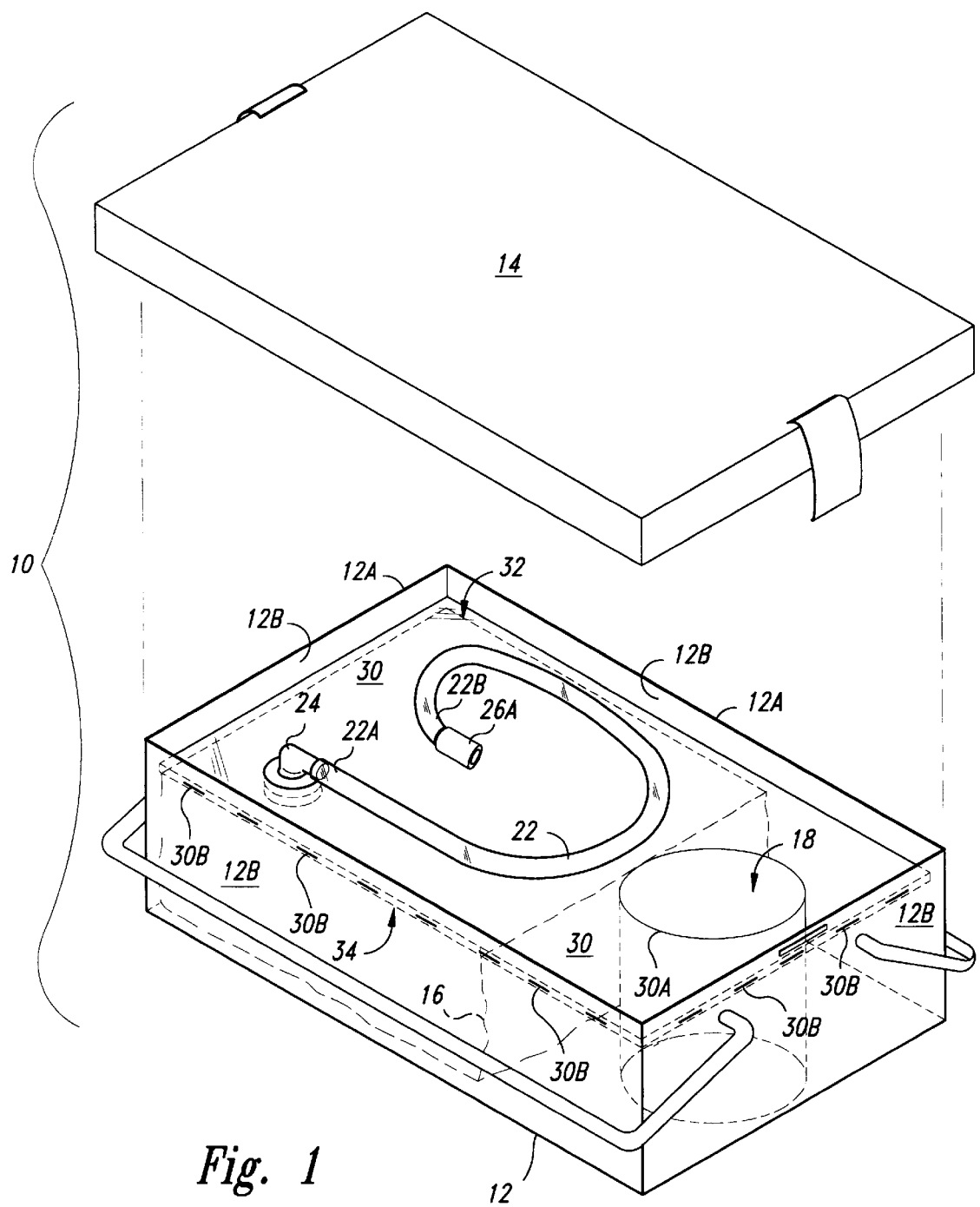
FIG. 1 illustrates an partially exploded isometric view of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

As more and more jurisdictions develop programs to eliminate the illegal disposal of used oil, a need arose for a safe and convenient means for "Do-It-Yourselfers" ("DIYs") to participate. Many jurisdictions pick up used oil, along with other recyclable at curbsides. Others are developing networks of locations to receive used oil for recycling.

Consequently, the present invention provides a system for collecting, housing, transporting, and dispersing used oil. In particular, this system accommodates the DIY individuals, who changes the oil on their own vehicles.

Figure 2A:
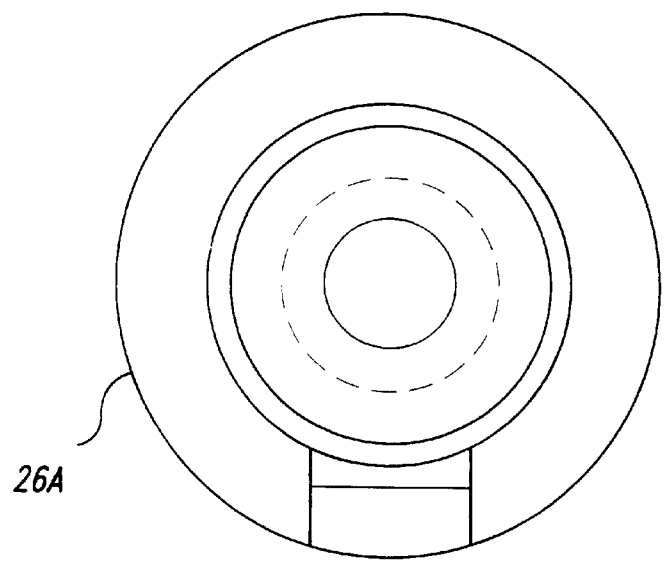
FIGS. 2A and 2B illustrate a top and a side view of a male portion of the drain valve system in accordance with the present invention of FIG. 1.
Figure 2B:
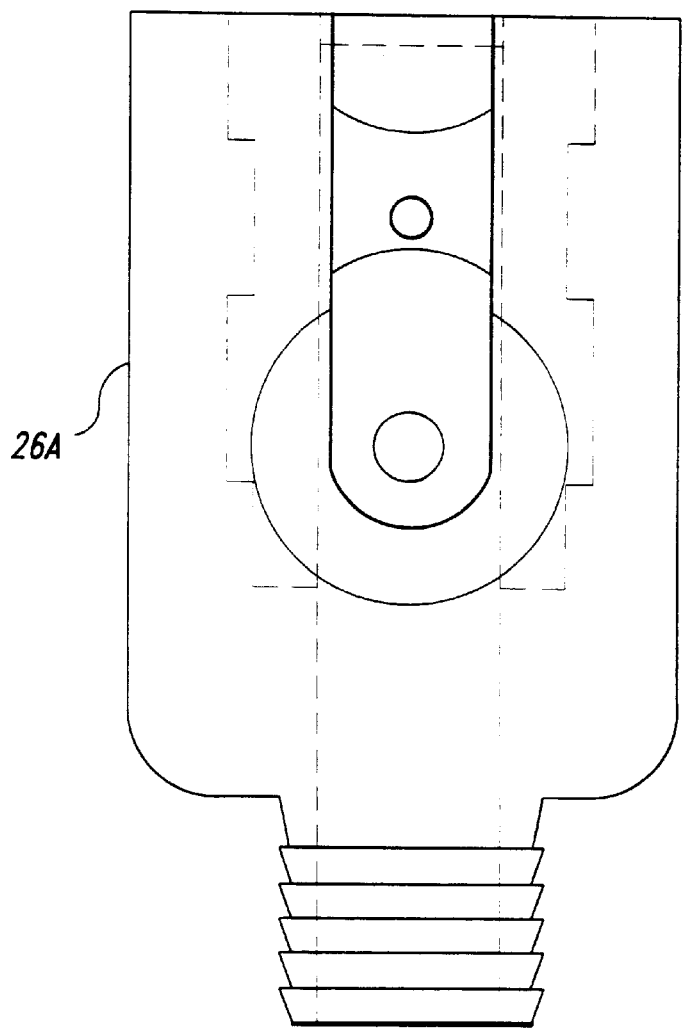
Figure 3A:
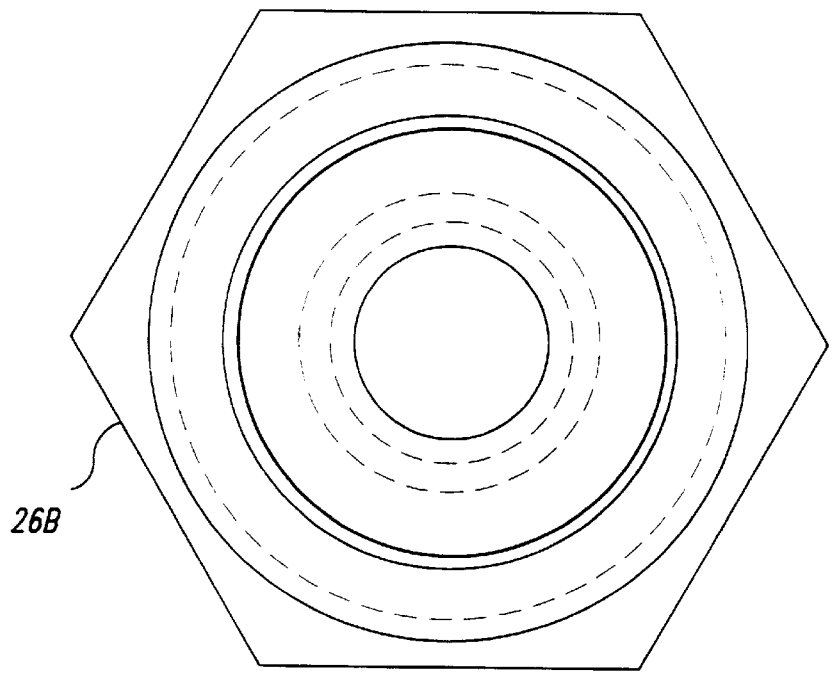
FIGS. 3A and 3B illustrate a top and a side view of a female portion of the drain valve system in accordance with the present invention of FIG. 1.
Figure 3B:
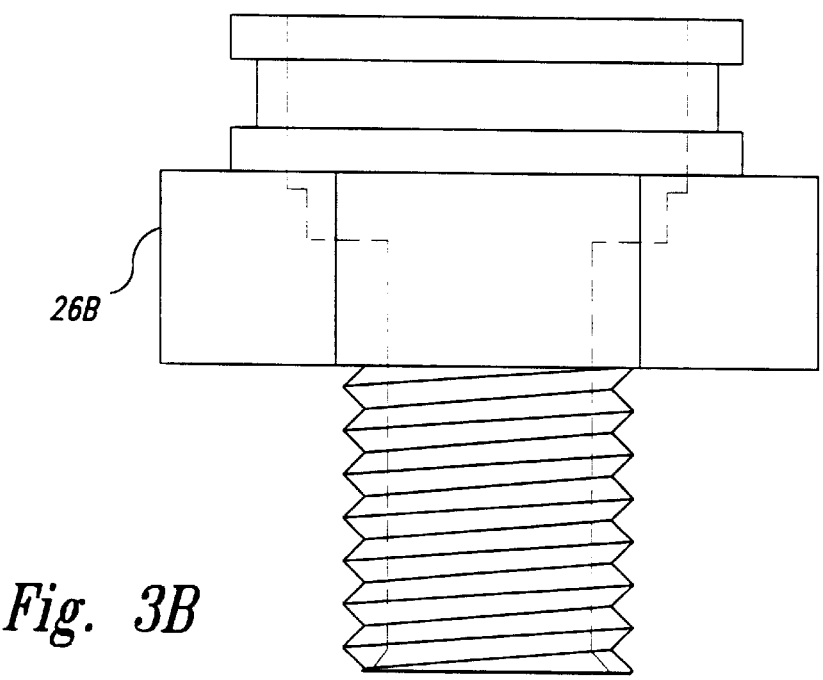
Figure 4A:
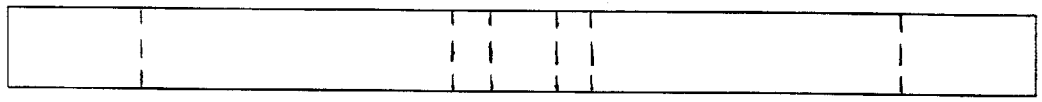
FIGS. 4A and 4B illustrate a side and a top view of the safety catch mechanism within the female portion of the drain valve system in accordance with the present invention of FIGS. 3A and 3B.
Figure 4B:
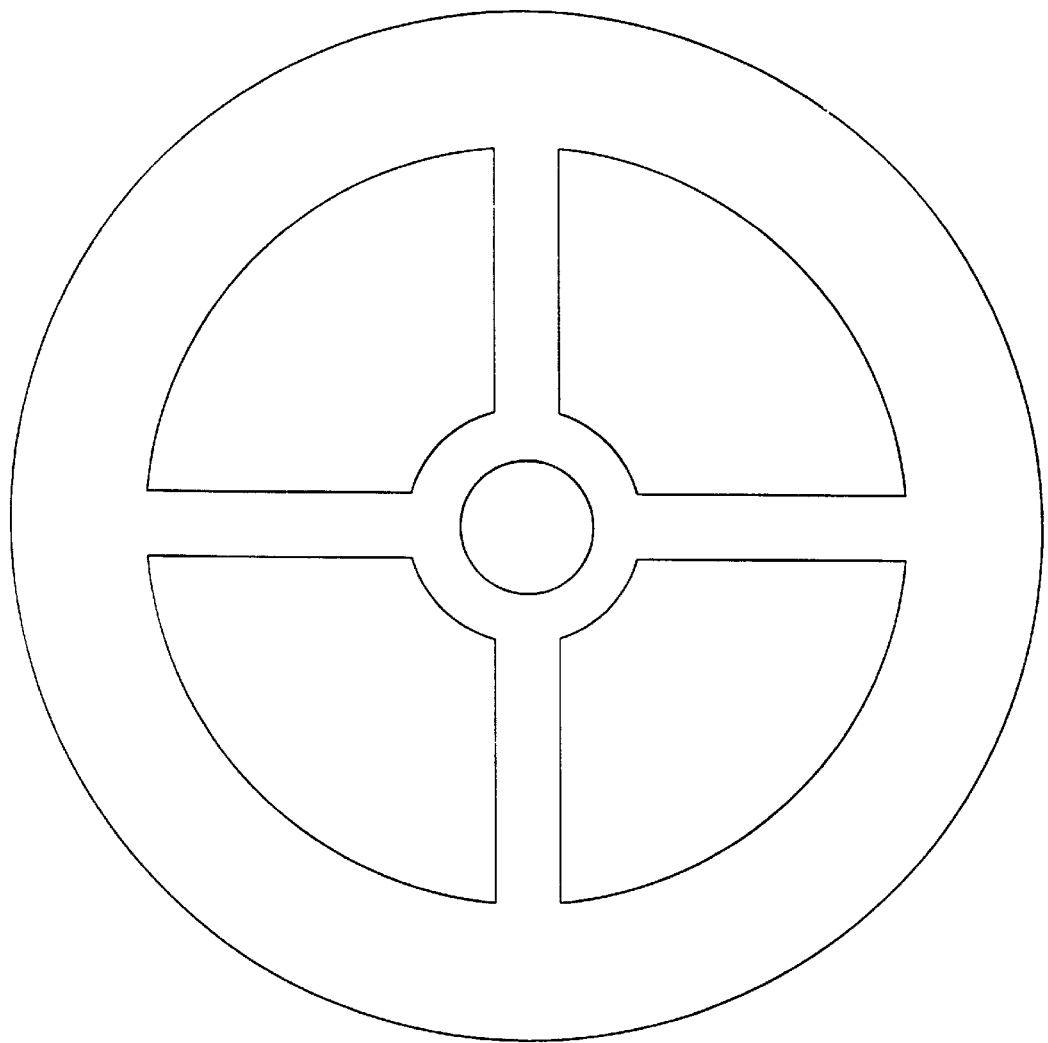

Turning now to the drawings, FIG. 1 illustrates a partially exploded view of the present invention in accordance with a preferred embodiment. In particular, recycling apparatus 10 features a housing container 12 with a lid 14 which holds a reusable hot fill bag 16, and space 18 to accommodate a separate container with lid (neither shown) to house a used oil filter (not shown). A hose 22 joins the hot fill bag 16 to a vehicle drain pan (not shown). A plastic clasp 24 joins one end 22A of the hose 22 to the hot fill bag 16. The male portion 26A (see also FIG. 2), of a conventional quick connect drain valve system, is attached at the other end 22B of the hose 22. The female portion 26B of FIGS. 3A, 3B, 4A and 4B, of the quick connect system, is installed in the vehicle drain pan (not shown) and replaces the previously supplied or original drain pan plug (not shown). A protective cap (not shown) snaps over the new drain plug or female portion 26B to prevent contaminants from entering.

In order to activate an oil change, the DIY places the recycling apparatus 10 of FIG. 1 in a position so that the hose 22 reaches the female drain plug portion 26B secured within the vehicle drain pan. The protective cap (not shown) is removed from the female portion 26B. The cover lid 14 of the housing container 12 is removed. The male portion 26A of the quick connect system is inserted into the female portion 26B, to activate a drain. Oil flows freely into the hot fill bag 16. Once drained, the male portion 26A of the quick connect system is released and placed on the container insert 30. The oil filter (not shown) is removed from the vehicle and placed into the oil filter container, and sealed with its lid (neither shown). The oil filter container is then inserted into the space 18 provided and the housing container 12 and the cover lid 14 is secured. The protective cap (not shown) is placed back over the female drain plug portion 26B on the vehicle. The recycling assembly 10 is ready to set at the curb for collection or delivery to an oil recycling facility.

The housing container 12 and lid 14 are made of plastic. It can be either injection or blow molded. The configuration will be as low profile as possible to accommodate being placed under a vehicle for an oil change. The housing container 12 will accommodate a "hot fill" bag 16, to hold the drained oil. It must be a heat resistant material to not be effected by the engine oil.

An insert 30 is secured inside and below the top 12A of housing container 12 to cover the hot fill bag 16 and provide a cut-out area 30A in which a separate cup or sealable container can be inserted to hold the used oil filter. The insert 30 is made of heavy duty plastic. It is secured by extruded knobs 30B on the edge of insert 30 inserted into pre-cut holes 30B on the wall 12B of the housing container 12. The insert 30 also provides the resting space 32 for the connector hose 22 and male portion 26A, when not in use for draining the oil.

The hot fill bag 16 is made of low density polyethylene and nylon. It holds approximately 6 quarts, but the size and volume can vary with the design of the housing container 12. The bag 16 is secured to the top 34 of the insert 30. At present it is glued, but it can be developed to use a nodule (not shown) created on the bag 16 that inserts into pre-cut, snap-in holes (not shown) on the insert 30. The bag 16 is secured in order to create a vacuum suction when the used oil enters the bag 16, thus increasing the speed of the drain.

The connector hose 22 is made of flexible plastic. It must be heat resistant of a tolerance to accommodate heated engine oil. It is attached at one end 22A to the plastic bag 16, using a plastic clamp 24. The male portion 26A of the quick connect system is attached at the other end 22B of the hose 22.

The conventional quick connect system features a safety catch within both the male 26A and female portion 26B. This ensures closure which prevents oil from dripping from the drain pan when the connector is released from the drain plug. It also seals the male portion 26A form dripping oil which is left within the drain hose 22.

The present invention as described above provides a recycling assembly 10 to make it safe and convenient to drain and change motor oil on a vehicle and, once changed, make it safe and convenient to legally dispose of the used oil and an associated oil filter.

Illustrative embodiments of the invention are described above. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

What is claimed is:

1. An apparatus to transfer a viscous product to or from an external storage area, said apparatus comprising:

a housing container having at least a first and second area;

a fill bag within said first area of said housing container;

a sealable container within said second area of said housing container adapted to store a filter associated with said viscous product;

a hose attached at one end to said fill bag; and a first mating portion of a drain valve system coupled to another end of said hose, said first mating portion of said drain valve system adapted to attach to a second mating portion of said drain valve system, wherein said second mating portion is coupled to said external storage area, and wherein attachment of said first mating portion to said second mating portion forms said drain valve system to cause transfer of said viscous product to or from said external storage area.

2. The apparatus of claim 1, further including an insert structure secured inside and below the top of said housing container to define at least said first and second areas within said housing container.

3. The apparatus of claim 2, further including a plastic clasp secured within said insert structure for coupling said hose to said fill bag, said hose being storable on an opposite side of the insert structure than the fill bag and within a third area of said housing container.

4. The apparatus of claim 2, wherein said fill bag is attached to said insert by an adhesive material.

5. The apparatus of claim 2, wherein said fill bag further includes nodules on the outer surface of said fill bag, said nodules secure said fill bag to said insert structure after being positioned within reciprocating pre-cut snap-in holes of said insert structure.

6. The apparatus of claim 2, wherein said insert structure further includes extruded knobs located around the periphery of said insert structure, said knobs secure said insert structure into said container when positioned within reciprocating holes of said housing container.

7. The apparatus of claim 1, wherein said housing container and said insert structure are made from a durable heat resistant plastic material.

8. The apparatus of claim 1, wherein said housing container is injection molded or blow molded.

9. The apparatus of claim 1, wherein said housing container provides a low profile to fit under a vehicle.

10. The apparatus of claim 1, further includes a lid for covering at least said hose, said first mating portion of said drain valve system, and said sealable container positioned within said housing container.

11. The apparatus of claim 1, further includes at least one handle for carrying said housing container.

12. The apparatus of claim 1, wherein said hose and said fill bag are made from a flexible heat resistant material.

13. The apparatus of claim 1, wherein said fill bag is made from a low density polyethylene and nylon material.

14. The apparatus of claim 1, wherein said first and second portion of said drain valve system further include a safety catch to prevent leakage of said viscous product before, during or after transfer of said viscous product to or from said external storage area.

15. A process for for transferring a viscous product between a housing container and an external storage area, the process comprising:

providing a fill bag within a first area of said housing container;

providing a sealable container within a second area of said housing container, said sealable container adapted to store a replaceable part associated with said viscous product;

providing a hose coupled to said fill bag, wherein a first mating portion of a drain valve system is coupled to a first end of said hose;

coupling said first mating portion of said drain valve system to a second mating portion of said drain valve system coupled to said external storage area, thereby forming said drain valve system to cause said viscous product to be transferred between said housing container and said external storage area.

16. The process of claim 15, further including the steps of:

removing the replaceable part from said external storage area;

inserting the removed replaceable part into the sealable container; and securing the sealable container in the second area of the housing container.

17. The process of claim 16, further including the step of positioning the resultant housing container at a pre-established location for collection or delivery to an recycling facility.

18. The process of claim 15, further including the steps of:

detaching said first mating portion of said drain valve system from said second mating portion; and removing a protective cap from at least one of said first and second portions of said drain valve system.

19. The process of claim 15, further including the steps of:

positioning said hose in a third area of said housing container;

placing a replaceable product in said sealable container; and placing a lid on said housing container.

20. The process of claim 15, further including the steps of:

detaching said first mating portion of said drain valve system from said second mating portion; and removing a protective cap from at least one of said first and second portions of said drain valve system.

21. An apparatus for receiving, transporting, and dispersing a viscous product from a first external storage tank to a second external storage tank, said apparatus comprising:

a housing container comprising an insert structure secured inside and below the top of said housing container to define at least a first area and a second area within said housing container;

a reusable fill bag fixably attached within said first area of said housing container;

a sealable container disposed in said second area of said housing container, said sealable container to store a replaceable part associated with said viscous product;

a drain valve system comprising a male portion and a female portion, said female portion being fixably mounted to at least one of said first and second external storage tanks; and a hose attached between said reusable fill bag and said male portion of said drain valve system to facilitate flow of said viscous product between said first and second external storage tanks and said housing reusable fill bag of said housing container.

22. The apparatus of claim 21, wherein said replaceable part comprises an oil filter associated with one of said first and second storage tanks.

23. A process for receiving, transporting and dispersing a viscous product, said process comprising:

positioning a housing container adjacent to a first storage tank, said housing container provides a usable space defined by a first, a second, and a third area;

inserting a male portion into a first female portion of a first drain valve system to initiate the flow of the viscous product between the first storage tank and a fill bag located in the first area of the housing container;

providing a sealable container within said second area of said housing container to store a replaceable part associated with said viscous product;

removing the male portion from the first female portion of the first drain valve system;

positioning a hose coupled between the fill bag and the male portion of the first drain valve system into the third area of the housing container; and inserting the male portion into a second female portion of a second drain valve system, said second female portion of the second drain valve system coupled to a second storage tank.

24. The process of claim 23, further including the step of positioning the resultant housing container at a pre-established location for collection or delivery to an recycling facility after the step of securing the sealable container.

25. The process of claim 23, further including the steps of:

removing said replaceable part from the first storage tank;

inserting the removed replaceable part into the sealable container; and securing the sealable container in the-second area of the housing container.

* * * * *